US012416500B1

(12) United States Patent
O'Brien et al.

(10) Patent No.: US 12,416,500 B1
(45) Date of Patent: Sep. 16, 2025

(54) EMERGENCY NAVIGATION GUIDANCE USING A BEACON DEVICE NETWORK

(71) Applicant: UIPCO, LLC, San Antonio, TX (US)

(72) Inventors: Kelsey Anne O'Brien, Austin, TX (US); Meredith Beveridge, Morrison, CO (US); Eric David Schroeder, San Antonio, TX (US); Manfred Amann, San Antonio, TX (US); Matthew Ryan Santacroce, Rio Rancho, NM (US); Kelly Q. Baker, San Antonio, TX (US); Donnette L. Moncrief Brown, San Antonio, TX (US); Justin Dax Haslam, San Antonio, TX (US); Timothy Frank Davison, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 696 days.

(21) Appl. No.: 17/246,103

(22) Filed: Apr. 30, 2021

Related U.S. Application Data

(60) Provisional application No. 63/018,357, filed on Apr. 30, 2020.

(51) Int. Cl.
*G08B 7/06* (2006.01)
*G01C 21/20* (2006.01)
*G08B 17/117* (2006.01)

(52) U.S. Cl.
CPC ........... *G01C 21/206* (2013.01); *G08B 7/062* (2013.01); *G08B 7/066* (2013.01); *G08B 17/117* (2013.01)

(58) Field of Classification Search
None
See application file for complete search history.

(56) References Cited

U.S. PATENT DOCUMENTS 7,629,894 B2 * 12/2009 Plocher .................... G08B 3/10
340/331
7,786,862 B1 * 8/2010 Campbell .......... A47G 29/1214
340/569

(Continued)

FOREIGN PATENT DOCUMENTS

| CN | 108109355   | * | 6/2018  | ............. G08B 25/10 |
| CN | 108109355 A | * | 6/2018  | ............. G01C 21/00 |
| KR | 101565727 B1| * | 11/2015 |                         |

OTHER PUBLICATIONS

Hamill, Melinda, et al., "Development of an automated speech recognition interface for personal emergency response systems", Jul. 8, 2009, Journal of NeuroEngineering and Rehabilitation (Year: 2009).*

*Primary Examiner* — Navid Z. Mehdizadeh
*Assistant Examiner* — Sarah A. Mueller
(74) *Attorney, Agent, or Firm* — Plumsea Law Group, LLC

(57) ABSTRACT

A method and system of providing guidance and information to an end-user during an emergency situation. A network of beacon devices is arranged throughout different rooms of a physical structure, such as a house. When an emergency situation such as a fire is detected, for example via data collected from one or more smart sensors installed in the house, a navigation server can activate the beacon device network. Each beacon device will begin to provide navigation cues such as audio content and/or light display that guide the end-user to the nearest designated exit.

20 Claims, 11 Drawing Sheets

(56) References Cited

U.S. PATENT DOCUMENTS

| | | | |
|---|---|---|---|
| 11,238,710 B2 * | 2/2022 | Wedig | H04W 4/33 |
| 2016/0054130 A1 * | 2/2016 | Marimuthu | G01C 21/206 |
| | | | 701/408 |
| 2017/0309142 A1 * | 10/2017 | Phillips | G08B 13/1672 |
| 2021/0248883 A1 * | 8/2021 | Ellis | G08B 7/066 |

* cited by examiner

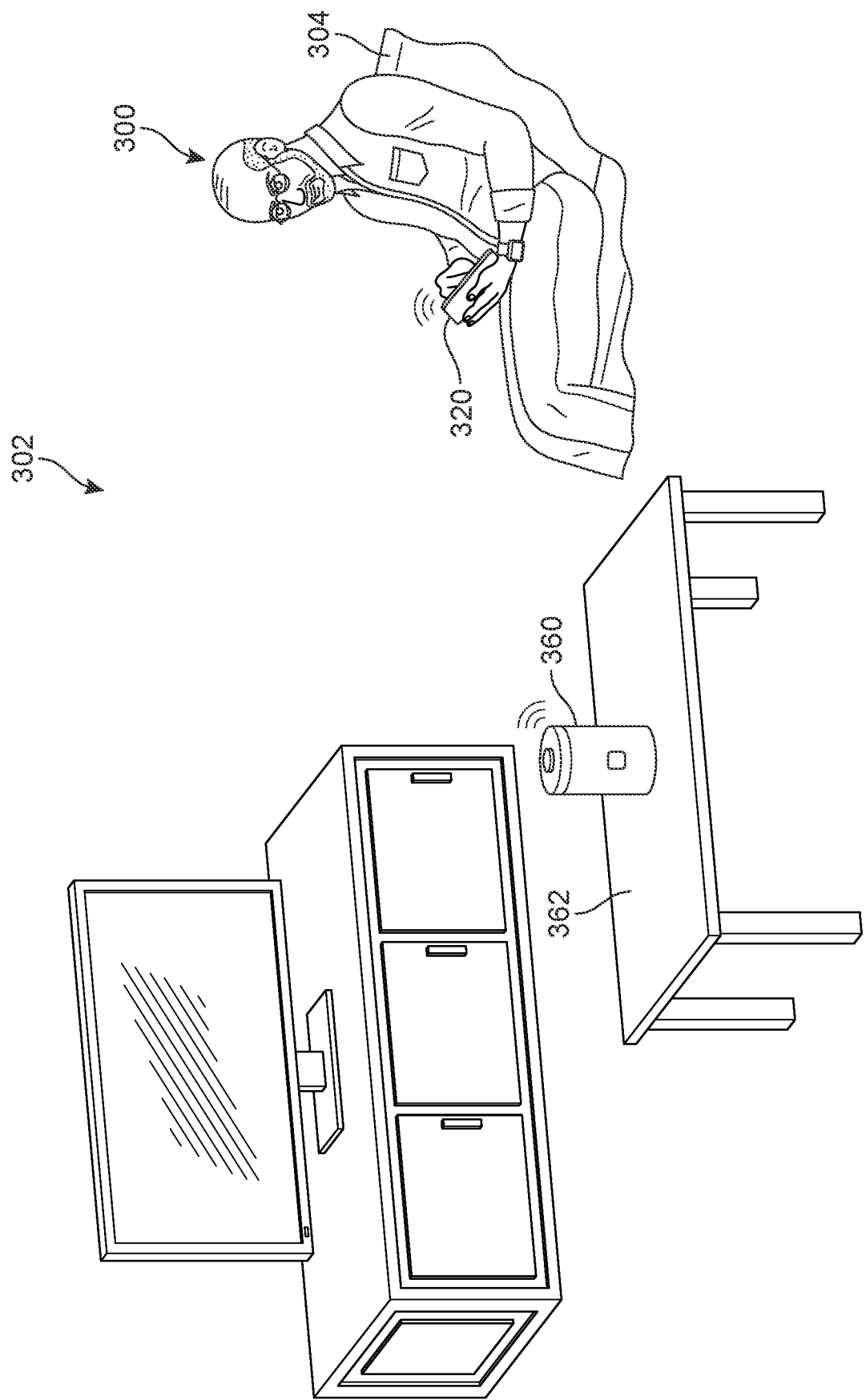

EMERGENCY NAVIGATION GUIDANCE USING A BEACON DEVICE NETWORK

CROSS-REFERENCE TO RELATED APPLICATION

This application claims the benefit of U.S. Provisional Patent Application Ser. No. 63/018,357 filed on Apr. 30, 2020 and titled "Emergency Navigation Guidance Using a Beacon Device Network", the disclosure of which is incorporated by reference in its entirety.

TECHNICAL FIELD

The present disclosure generally relates to methods and systems for providing navigational directions, and in particular to methods and systems for providing navigational directions during an emergency.

BACKGROUND

During unexpected emergencies, such as a fire, severe storm, flood, or earthquake, people may be required to evacuate a particularly dangerous location and find a safer location. While many navigation and routing systems provide directions for vehicles or for people walking, existing systems are unable to guide persons who are indoors and require room-by-room guidance. Furthermore, conventional navigational and routing systems rely on the ability to display directions on a screen and/or GPS feedback regarding the user's location. Such systems cannot be implemented with wearable devices that lack screens and/or for users who are separated from their devices.

There is a need in the art for a system and method that addresses the shortcomings discussed above.

SUMMARY

In one aspect, a method for conveying navigation guidance to an end-user during an emergency situation is disclosed. The method includes receiving, via a navigation support system, information indicating an occurrence of an emergency situation associated with a physical structure. This may lead to the system causing a beacon device network that includes a plurality of beacon devices installed in the physical structure to become activated. The method also includes providing, via a first beacon device located in a first area of the physical structure, a first alert signal. In addition, the method includes providing, via a second beacon device located in a second area of the physical area, a second alert signal that differs from the first alert signal, where the second beacon device is nearer to a designated exit of the physical structure than the first beacon device.

In another aspect, a system for conveying navigation guidance to an end-user during an emergency situation is disclosed. The system includes a processor and machine-readable media including instructions which, when executed by the processor, cause the processor to receive, via a navigation support system, information indicating an occurrence of an emergency situation associated with a physical structure, as well as provide, via a first beacon device located in a first area of the physical structure, a first alert signal. The instructions further cause the processor to provide, via a second beacon device located in a second area of the physical area, a second alert signal that differs from the first alert signal, where the second beacon device is nearer to a designated exit of the physical structure than the first beacon device.

In another aspect, a beacon device network configured to provide navigation guidance to an end-user in an emergency is disclosed. The beacon device network including a navigation server, and a plurality of beacon devices configured to emit one or both of an audio-based signal and a light display. Each of the plurality of beacon devices is positioned in different areas of a physical structure. In addition, each of the plurality of beacon devices includes a communication module for communicating with the navigation server over a network, and each of the plurality of beacon devices emits an alert signal in response to a request from the navigation server.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIGS. 3A and 3B are an illustration of an end-user enrolling a beacon device in a home beacon device network, according to an embodiment;

DESCRIPTION OF EMBODIMENTS

A system and method for guiding a user through a low-visibility or otherwise dangerous environment to a safe location is disclosed. The system includes a plurality of IoT or smart devices connected to a network and arranged throughout a physical space, such as a house, apartment building, or other physical structure or edifice. In some embodiments, the devices can serve as beacons and receive sensed information via internal sensors and/or from other nearby devices such as a smoke detector. Based on the sensed information, pre-programmed location settings, and/or a triggering signal, the system can determine that an evacuation is recommended and provide dynamic navigation instructions to a user to guide them to a safer location, away from potential danger (such as fire or flooding). For example, if the system determines the house is on fire, such that it becomes likely that smoke will obscure the passage of a user through the house to the nearest exit, the system may be activated. The system leverages its network and information about the location of each device to guide a user through a room or series of rooms or spaces to the nearest exit. In some examples, such guidance may be provided by voice instructions or other sounds, and in other examples the guidance may be provided by a specific pattern or intensity of lights associated with the devices.

Figure 1:
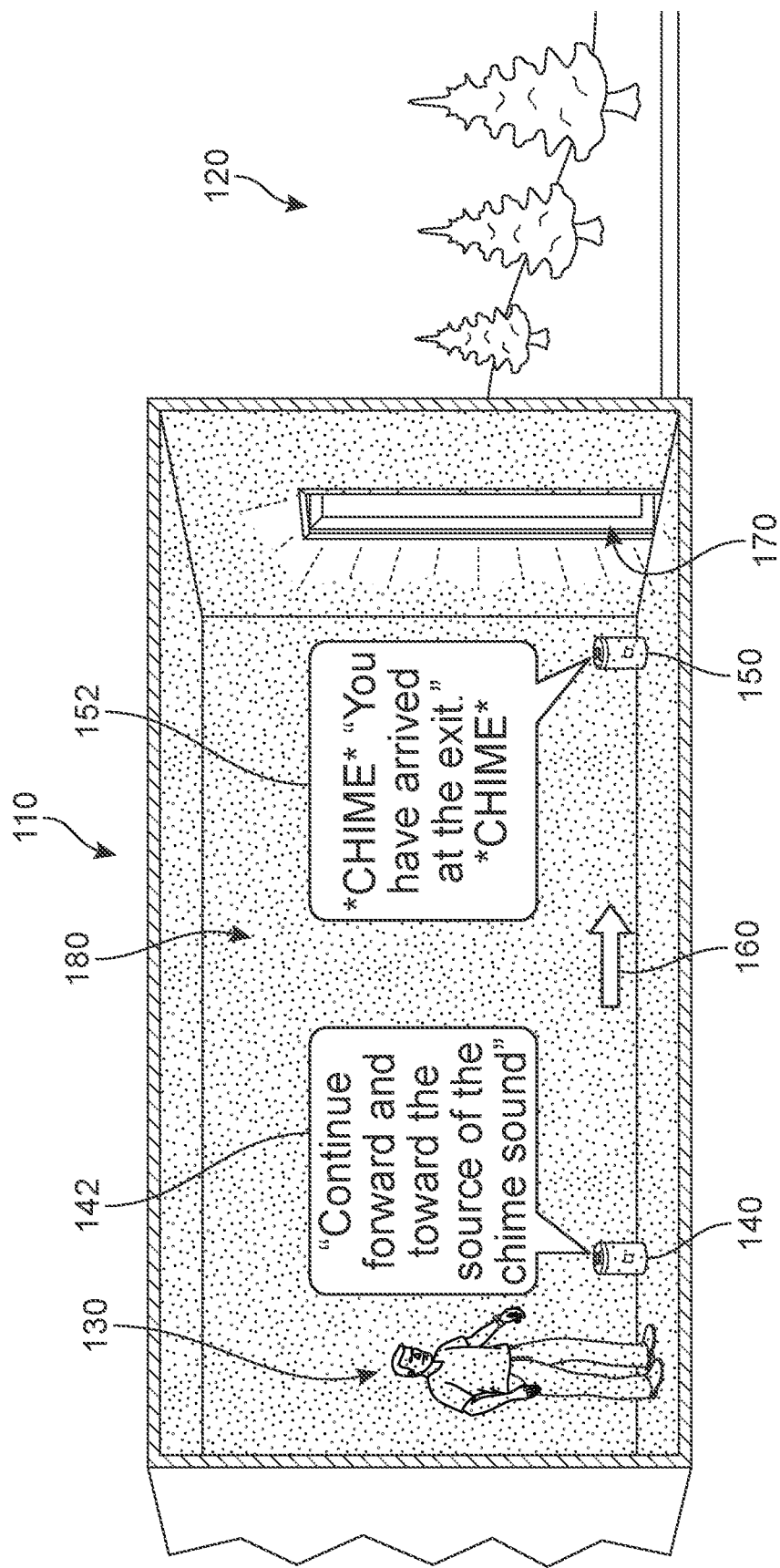
FIG. 1 is an overview of a system configured to provide navigation guidance to an end-user during an emergency situation, according to an embodiment.

Referring now to FIG. 1, for purposes of introduction, a first person 130 is shown in a building 110. Space 180 in which the first person 130 is located currently is a large room which has limited or no sources of light. In other words, the power for the building 110 has gone out, and the near-total darkness is obscuring the view of exit 170 to outside 120 from first person 130. A first device 140 is located at a first position and a second device 150 is located at a second position that is nearer to the exit 170 than the first position. The first device 140 and second device 150 (comprising a "device network") are configured to receive and send data from/to a nearby client computing device ("client device") via a local or other network, and/or to a network providing internet connectivity. In some embodiments, the device network may include an electronics unit comprising a plurality of different components, such as a user interface component (e.g., a touchscreen display, keyboard, mouse, microphone, etc.), a sensor unit, a user interface module, a processor, and/or a communication module. In some embodiments, the devices of device network may also include a speaker and/or bright light emitting features. In this example, first device 140 and second device 150 are speaker-equipped devices linked to a network.

In different embodiments, one or more devices of the device network may include a computing system including one or more processors and memory. Memory may comprise a non-transitory computer readable medium. Instructions stored within memory may be executed by the one or more processors. The device computing system may be configured to receive and analyze data from various sensors associated with an internal sensor unit or data that is communicated from external sensors to the device. In different examples, the sensor unit includes one or more of a variety of sensors. The sensors can include one or more of a light sensor, an air pressure sensor, a microphone, a speaker, a smoke detector, a moisture sensor, among others.

As first person 130 struggles to move through building 110, he is unable to clearly see a path toward the exit 170. In some embodiments, the device network is configured to offer the first person 130 staged guidance toward the exit 170 based on output that does not require clear visibility. In the embodiment of FIG. 1, first device 140 repeatedly emits at least a first audio output 142 from its speaker(s), here guiding the user to "Continue forward and toward the source of the chime sound." The second device 150 is currently emitting a loud chiming sound as a second audio output 152 (*CHIME* "You have arrived at the exit." *CHIME") that differs from the first audio output 142. Because the two devices were in a pre-arranged position relative to one another and the exit, the audio associated with each device is able to reliably guide a person in a path 160 leading toward exit 170.

References to various aspects of navigation and risk detection will be discussed throughout the following disclosure. As a general matter, "emergencies" can include natural disasters, such as wild fires, floods, tornados, hurricanes, blizzards, and earthquakes, as well as man-made disasters such as house/building fires and mass shootings. It may be appreciated that the present embodiments could be utilized with any kind of emergency situation where a user needs guidance moving from one location to another under duress and in an expedited manner. In some cases, "detecting an emergency" may involve receiving information over a network that can be used to determine an emergency situation has arisen. For example, data shared from other local devices and sensors such as a smoke alarm, carbon monoxide detector, etc. can be used to trigger a navigation session. In other cases, the user may determine that an emergency is occurring and could manually start an emergency navigation session if the device network is configured for voice-activation and/or in cases where the device(s) of device network include a manual button or other trigger to initiate the navigation session.

As used herein, the term "safe zone" or "safe location" refers to a geographic area that has been identified as being safe (or safer) with a relatively high probability. For example, in a house fire, any location sufficiently far outside of the house might be considered a safe zone or safe location. In a flooding town, any location sufficiently above the ground (or sea level) may be considered a safe zone. Although the process shown in FIG. 1 describes using information from nearby devices to identify potential safe zones, the same process can also identify potential danger zones. By knowing the locations of the devices in the danger zones, a system can help a user avoid the danger zones. Alternatively, a system could convey information about the locations of any danger zones to another system or party that may be interested in that information.

In some embodiments, a sensor may include a microphone that can collect data to determine whether specific sounds in the house or building indicate an emergency situation, or sounds that are anomalous to the environment and may represent danger. For purposes of this application, the term ambient noise information is the sound profile collected for a particular location or space during normal, day-to-day use of such space. In some embodiments, current sound information is received by a sensor or other smart device, which identifies whether there is a variation in sound between the current sound information and the ambient noise information. The ambient noise information is subtracted from the current sound information if the variation has been identified, to identify a sound anomaly. The smart device extracts a sound anomaly signal and sends it to a database, where the sound anomaly signal is compared to predetermined anomaly signals stored in a database wherein the predetermined anomaly signals are associated with diagnostic information. In some other embodiments, a device or associated sensor can include features found on some smart devices. For example, a camera may be used to document optional factors, such as color and quality (density) of smoke or flames or the amount of light available.

Figure 2:
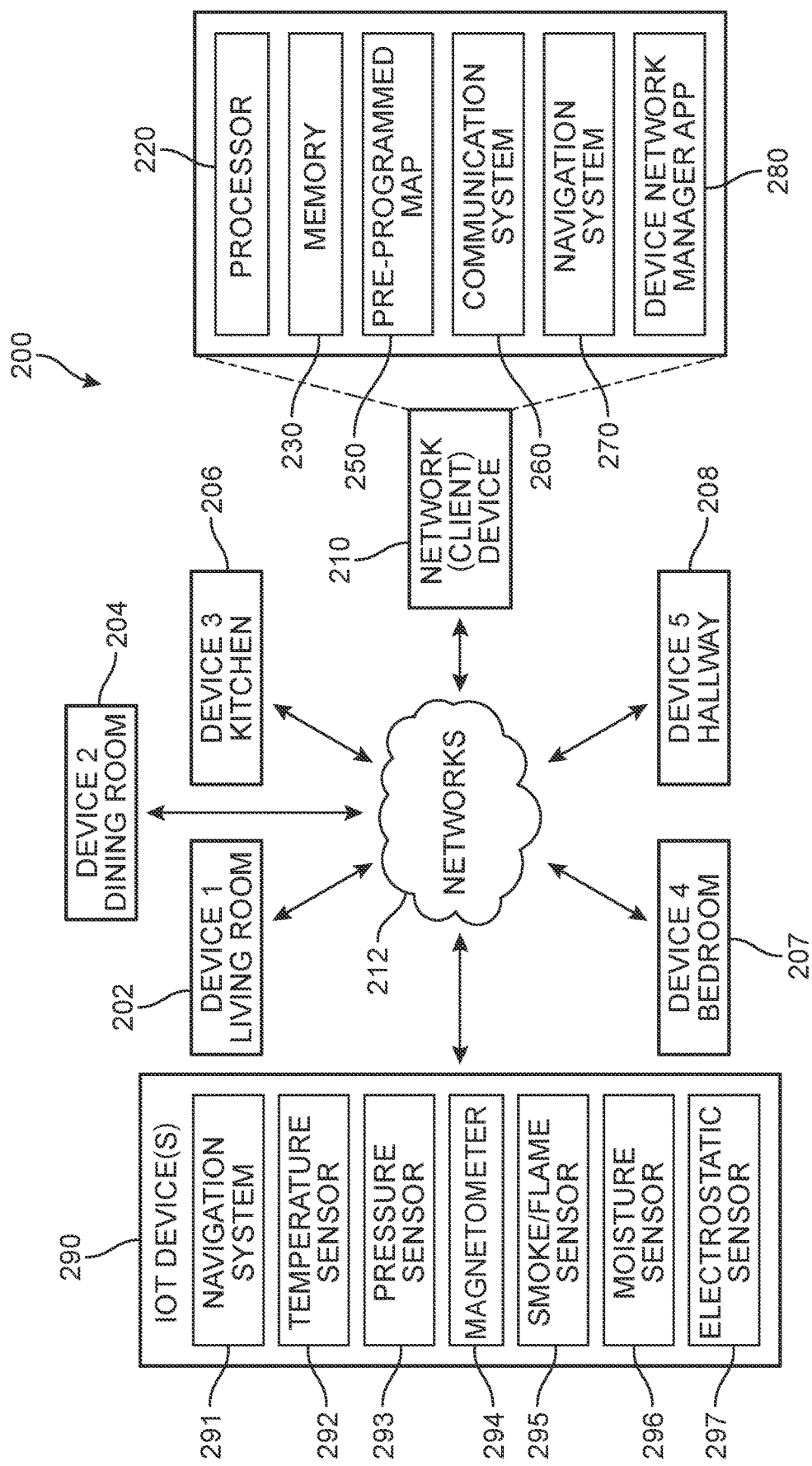
FIG. 2 is a schematic diagram of a system for providing navigation guidance to an end-user during an emergency situation, according to an embodiment.

In order to provide the reader with a greater appreciation of the embodiments, FIG. 2 depicts an overview of an embodiment of a navigation support system ("system") 200 in which a device network emits signals from anchor points arranged throughout a space to help 'walk' a person to a safe position. The schematic view shows a plurality of devices (here including a first device 202, a second device 204, a third device 206, a fourth device 207, and a fifth device 208) connected over one or more networks 212. The devices, which may also be referred to herein as beacons—may be smaller than a golf ball and limited in functionality to navigation signals and basic communication (such as an IoT device), or may refer to more comprehensive smart assistant computing devices which are also configured to provide an array of other functions, including a microphone for receiving voice commands and/or a display for viewing information and inputting touch inputs.

Networks 212 could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple speakers or light-emitting devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or technology suitable for a low-power, low data rate, and close proximity (i.e., personal area wireless ad hoc network, such as Zigbee® technology, among other possibilities. In many cases, the communication module is a wireless connection; however, wired connections may also be used. For example, the communication module may include a wired serial bus such as a universal serial bus or a parallel bus, among other connections.

In some embodiments, the devices can also be in communication with a user client device ("user device") 210, such as a desktop or laptop computer or mobile phone or other computing device. Furthermore, in some embodiments, user device 210 and/or the plurality of devices may also be connected to one or more of a stationary internet of things (IoT) device(s) ("smart sensors") 290. Smart sensors 290 could comprise any of a variety of different IoT devices, such as one or more of a pressure sensor 291, chemical sensor 292 (for detecting smoke, carbon monoxide or other chemical compositions), temperature sensor 293, magnetometer 294, smoke/flame detectors 295, moisture sensor 296, electrostatic sensor 297, volume/sound sensors, light sensors, aerosol characterization sensors, and other smart devices that may include one or more sensors.

Furthermore, in different embodiments, the user device 210 may include provisions for communicating with, and processing information from, nearby devices. Moreover, the other devices communicating with user device 210 may also include some or all of these provisions. As seen in FIG. 2, user device 210 may include one or more processors 220 and memory 230. Memory 230 may comprise a non-transitory computer readable medium. Instructions stored within memory 230 may be executed by the one or more processors 220. User device 210 may also include one or more pre-programmed map 250, a communication system 260, a navigation system 270, and a device network manager application ("application") 280. Communication system 260 may include radios or other provisions for communicating using one or more communication methods. In particular, communication system 260 includes provisions for communicating with other nearby devices over networks 212. For example, each communication system could include a Wi-Fi radio, a Bluetooth radio, and/or a cellular network radio.

In addition, navigation system 270 may comprise any system capable of providing directions and/or other kinds of routing information between two or more locations. In some cases, navigation system 270 can provide directions in an outdoor environment. In other cases, navigation system 270 can provide directions in an indoor environment. In some cases, navigation system 270 may provide directions in both outdoor and indoor environments.

In some embodiments, an end-user can interact with and adjust settings associated with the proposed system, for example via user device 210. In some embodiments, the application 280 can offer a device registration and profile interface ("interface") for implementing the device network and smart navigation system. In some embodiments, an application may be available that connects a user's device (for example, via a WiFi or cellular connection) with an online service provider to change the settings stored in the cloud, and automatically update the corresponding settings and information. The application can offer a user interface that may be accessed via any user computing device configured for connection to a network. Thus, while in some cases the user device 210 may be local (i.e., within the same physical space as the device network) in other cases the user device 210 can be located remote relative to the plurality of devices.

In different embodiments, the application 280 can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In some embodiments, the interface can include options for registering a device. In addition, a plurality of data input fields can also be presented. Some non-limiting examples of such fields include fields directed to identification of the device and its location (e.g., Room 21, Conference Room, etc.). As shown in the non-limiting example of the FIG. 2, each device can be assigned a particular room in a home, such that the profile for first device 202 indicates its position in the living room, second device 204 in the dining room, third device 206 in the kitchen, fourth device 207 in the bedroom, and fourth device 208 in the hallway. Further information on registration and pre-programmed mapping is provided with respect to FIGS. 3A, 3B, and 4.

Figure 3B:
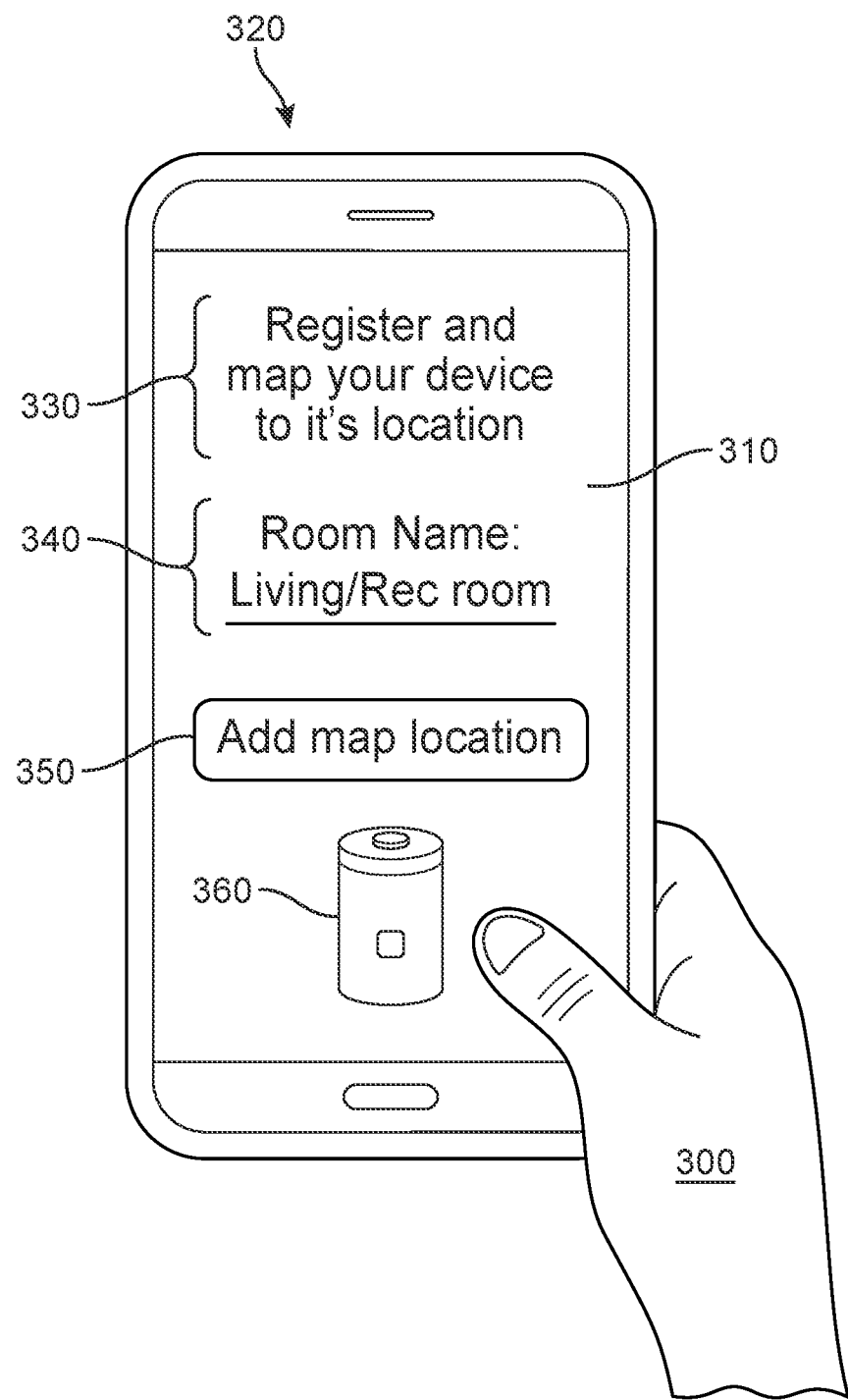

Referring now to FIG. 3A, a user 300 is depicted at a first time seated on a sofa 304 in a living room space 302 while accessing a device registration application on mobile computing device 320. The user 300 is attempting to connect a newly obtained navigation device 360, shown here disposed on an adjacent table 362, to his device manager profile. In FIG. 3B, an example of an interface 310 is presented on a touchscreen display of a mobile device 320 offering content via native controls included in the interface 310. In some embodiments, the interface 310 can include a welcome or header message 330, as shown in FIG. 3B ("Register and map your device to its location"). In addition, one or more data input fields can also be presented. An example of such a field is shown in FIG. 3B, including first input field 340 ("Room Name:") and input ("Living/Rec Room"). In other embodiments, the user 300 can be provided with a dropdown or other list to select a room or room type (e.g., Living Room, Master Bedroom, Foyer, Bathroom, etc.).

Once the location is selected and submitted, the application can be configured to communicate the information over a network to the designated device (here device 360), for example over a personal area network (PAN), short-range wireless communication (e.g., Bluetooth®, NFC), a local area network (LAN), etc. In other embodiments, the application 310 can convey the information over a network to a server, which can update the user's online management account and device profile to include the location information for the selected device. In different embodiments, the location information may be stored locally by the device and/or remotely on a user's cloud management account. In some cases, the user can further assign a name to an individual device, assign multiple devices to a single group, assign or identify a room name, and many other functions. In addition, the interface 310 can provide a plurality of selectable options, such as navigation options (e.g., "Back", "Save", "Next"), or additional menu options for accessing other features or aspects of the device or user profile. In some embodiments, this registration process can also be performed over the phone with a service representative.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

In some embodiments, the interface 310 also offers an opportunity for the user 300 to map the device network to the specific physical space in which it is being integrated. For example, mapping option 350 may open a new window or application feature whereby the user can input information describing the building as a whole and pre-programmed information that indicates the optimal exit routes from each room or space in the building. As one example, in FIG. 4, user 300 is shown at a client device 420 accessing a mapping interface 410 on a display 430. Once the user has inputted data describing the arrangement of his or her home or building, this layout can be used to facilitate the mapping of the device network. In some other embodiments, a central server or cloud-computing platform or some other device could then automatically determine the routes using uploaded maps, diagrams, architectural drawings of the building, as well as using a map generated based on positional information obtained from the devices of the device network (e.g., positional information from the devices is used to construct a map of the house).

For each room in the house, the user can provide an identification of the best exit route, or the mapping interface 430 can be configured to generate the most likely best route based on the start point and desired end point. The user herself may also input the preferred exit route, as well as 'backup' exit routes that may be identified in case the preferred exit route is deemed too dangerous. For example, the user may identify a sequence of intermediate navigation locations to take the user along a path from the current location to the designated exit. For example, if the user is in an upstairs bedroom in a house and the safe zone is outside, the set of intermediate navigation locations may include a location in an upstairs hallway, a location on a staircase, and a location in a living room adjacent a front door.

Figure 4:
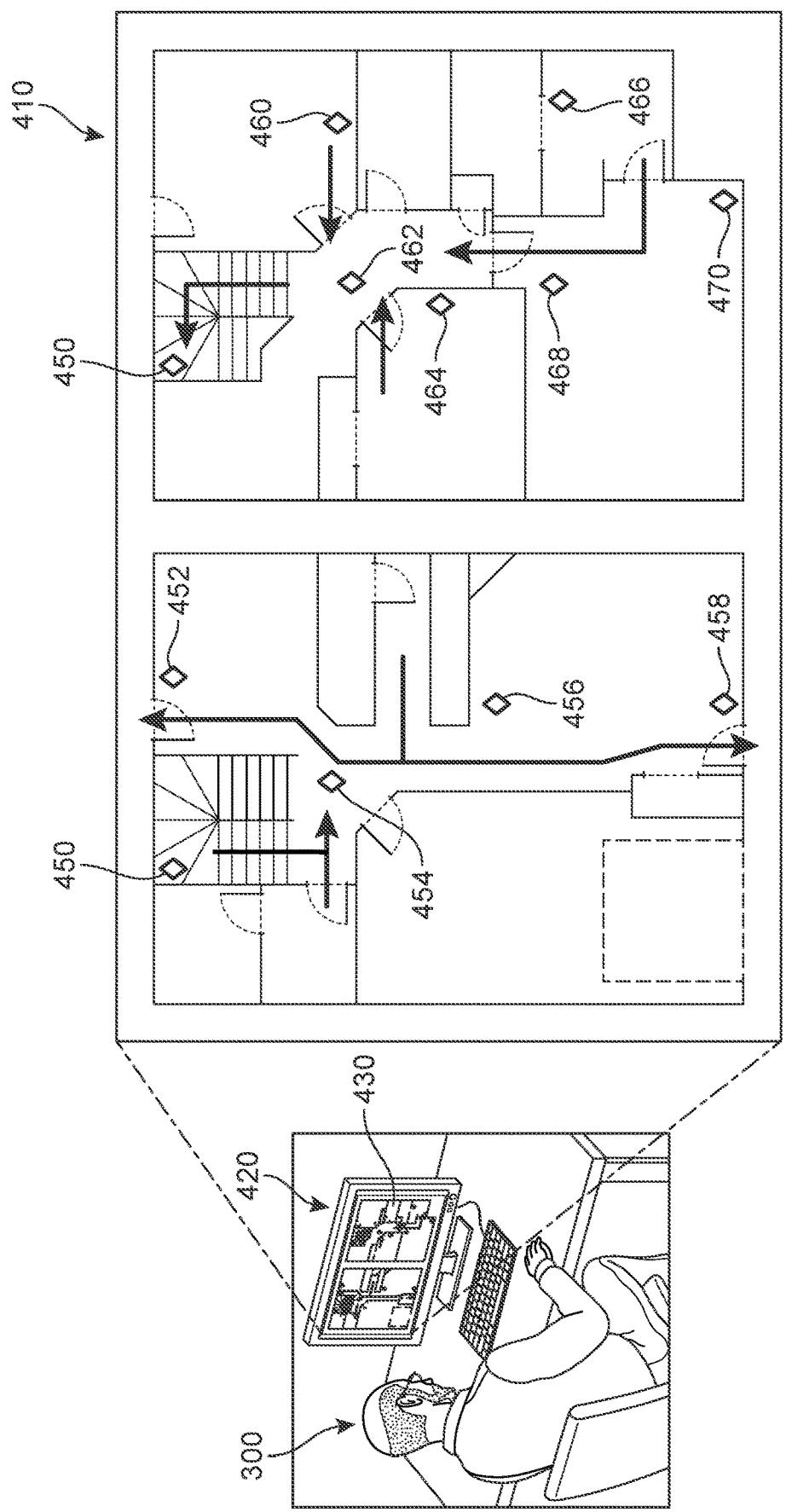
FIG. 4 is an illustration of the end-user of FIG. 3A mapping the home and assigning multiple device beacons to various rooms in the house, as well as designating an evacuation route and exits, according to an embodiment.

In FIG. 4, it can be seen in the schematic displayed on mapping interface 410 that eleven beacon-devices (i.e., on the ground floor, a first device 450 located on the stairwell, a second device 452 located in a dining room, a third device 454 located in a foyer, a fourth device 456 located in a first part of the living room, a fifth device 458 located in a second part of the living room (nearer to the front door), and on the second floor, again the first device 450 is represented on the stairwell, a sixth device 460 located in a first bedroom, a seventh device 462 located in a hallway, an eighth device 464 located in a second bedroom, a ninth device 466 located in a bathroom, a tenth device 468 located in a first part of the master bedroom, and an eleventh device 470 located in a second part of the master bedroom nearer to the bathroom) comprise the device network arranged through the home. In different embodiments, the devices may be mapped via an indoor positioning system (IPS). For example, a user may open or launch mapping interface 410 that is configured to use IPS and/or other indoor localization techniques to create a map of the home or portions thereof. In one embodiment, one or more of the devices may include an RFID tag to generate location information.

In other embodiments, the mapping process can be performed in an automatic or semi-automatic fashion. The devices can, for example, generate and transmit positional information and send the location information to the central server or cloud computing platform, or to the mapping interface 410. For example, as the device is being added to the network, it may prompt the user via an LCD or other display or voice queries to confirm its location (e.g., kitchen, laundry room, etc.) using voice, touch, or button-based inputs. In some cases, the device(s) may be equipped to determine GPS coordinates, Wi-Fi location, or cellphone tower location information and transmit this information to the server to attempt to automatically construct a map of the space.

It should be appreciated that while the device as illustrated is an elongated smart home device, the devices used can be much smaller and inexpensive, comprising only an output mechanism such as a speaker or LED array and a communication module for receiving instructions and/or commands. Thus, a user can purchase the desired number of beacon devices at low cost and install them throughout their home or physical structure in an unobtrusive manner. In some embodiments, the devices can be smaller than a golf ball and lightweight, making them easy to position on ceilings, walls, floor, or on furniture or appliances. The devices can include batteries that are rechargeable, for example via a micro-USB port, and/or be configured to plug into an outlet to maintain a stable level of power or be recharged. In some embodiments, the device can be water-resistant or waterproof, buoyant in case of flood, as well as heat or flame resistant. As one example, the beacon device can weigh as little as 6-10 grams and include both a speaker and light array, as well as a communication module. In some embodiments, the device beacons can be readily attached on a ceiling, wall, or a furniture surface with adhesive and easy to remove and reposition.

Referring now to FIGS. 5-9, a sequence of drawings illustrates one example of a use of a navigation support system ("system"). It should be understood that while the drawings illustrate one example of a home environment within which one or more of the devices, methods, systems, services, and/or computer program products described further herein can be applicable, any other structure may implement said systems. In different embodiments, a structure can include a plurality of rooms, separated at least partly from each other via walls. The walls can include interior walls or exterior walls. Each room can further include a floor and a ceiling. Devices can be mounted on, integrated with and/or supported by a wall, floor, ceiling or other surfaces. The home environment depicted in FIGS. 4-9 includes a two-story structure, such as a house, office building, garage, townhome, or mobile home. It will be appreciated that the system can also be integrated into an environment that does not encompass the entire structure, such as an apartment, condominium, or office space. Furthermore, the system can control and/or be coupled to devices outside of the actual structure.

Figure 5:
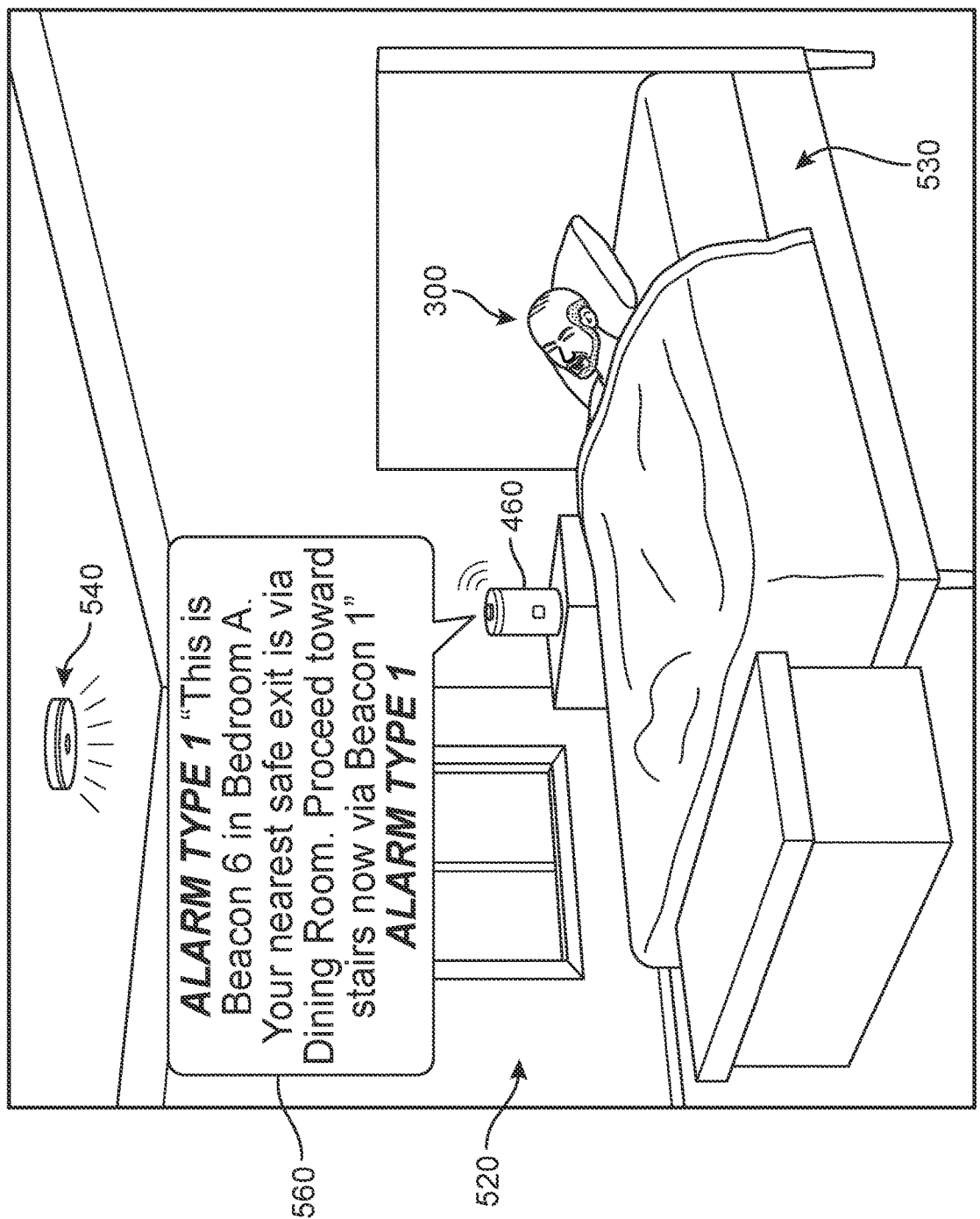
FIG. 5 is a depiction of the end-user being awakened by a nearby device beacon during an emergency situation, according to an embodiment.

In FIG. 5, a bedroom 520 corresponding to the first bedroom in the schematic map shown in FIG. 4 is depicted. The sixth device 460 is located in the bedroom 520. User 300 is sleeping in a bed 530 of bedroom 520. In different embodiments, in the event that an emergency situation is identified, network devices may receive sensed information from nearby smart devices such as smoke detector 540 or other devices arranged throughout the house, and determine that a navigation session is warranted.

Figure 6:
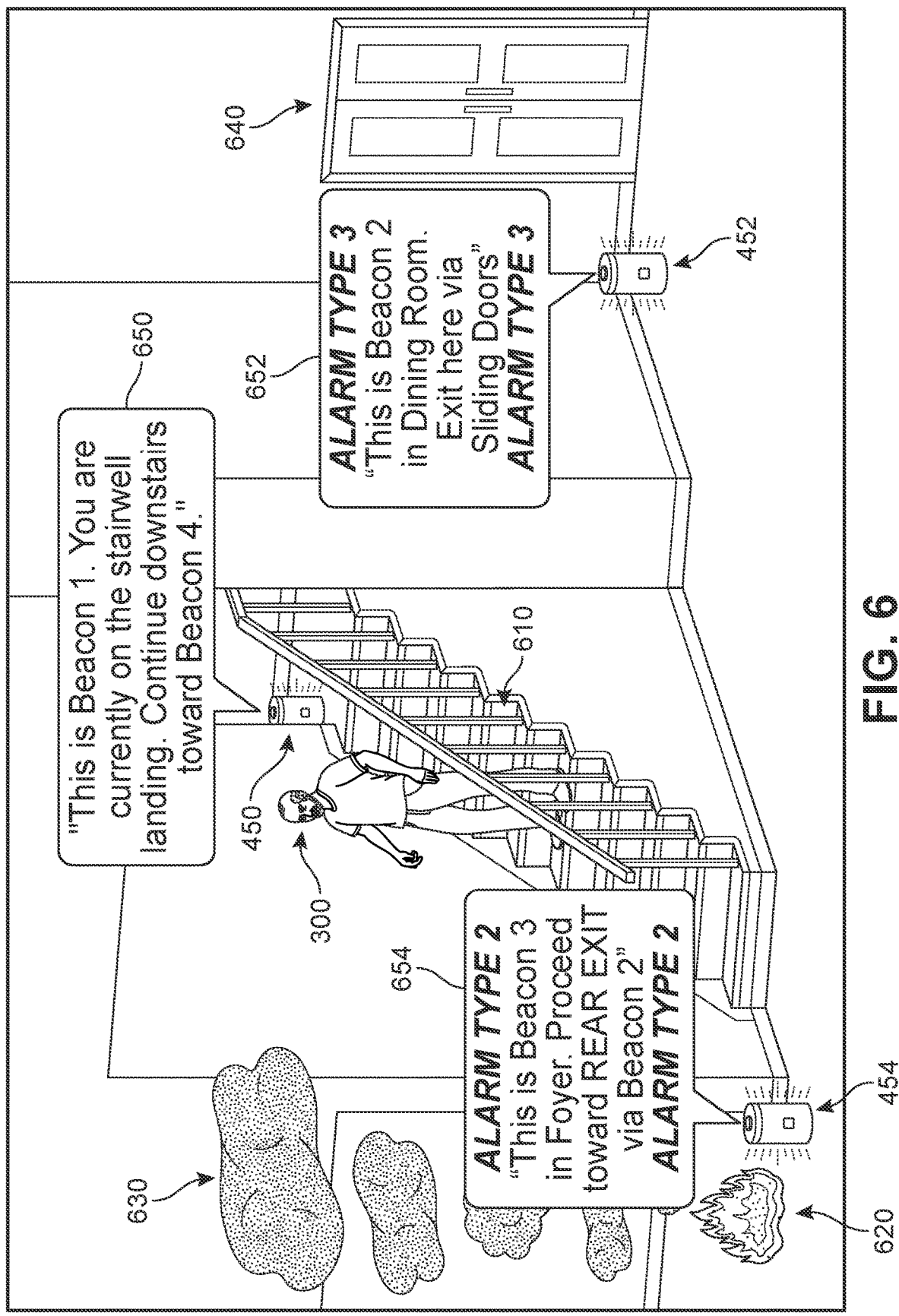
FIGS. 6-8 depict a sequence in which the end-user receives a series of navigation cues as the end-user moves through the house toward an exit, according to an embodiment.

As noted earlier, in some cases, one or more devices may be configured to determine whether it is in a dangerous situation by contrasting normal or ambient conditions, such as temperature or the presence of smoke, with current conditions. For example, if the device network receives temperature data from a nearby temperature sensor that includes very hot temperatures, the system may infer that the environment is close to a fire and therefore that area is not a safe zone. In FIG. 6, a temperature sensor located near the downstairs kitchen has received data that the system uses to determine an emergency situation is occurring and an evacuation is warranted. In this case, the system triggers a pre-selected audio alert that is emitted from some or all of the devices in the device network. In FIG. 6, sixth device 460 begins to automatically emit a loud, repeating first audio output 560 (<* ALARM Type 1*> "This is Beacon 6 in Bedroom A. Your nearest safe exit is via Dining Room. Proceed toward stairs now via Beacon 1"<* ALARM Type 1*>). This audio output can be personalized and/or selected from a list of available audio types. Various types of sounds can be incorporated into the warning, and volume, speed of playback, and voice type can be adjusted to correspond to the user's preferences. The spoken words can be entered by the user or pre-selected by the system defaults. For example, navigation type directions may be produced, such as "Move forward", "Go toward the stairs". The Alarm Types can be represented by different types of warning sounds (e.g., shrill whistles, ringing, beeps, chimes, tones, etc.) that can be associated with specific rooms or locations. In other words, as will be described below, each device beacon can be configured to produce its own characteristic signal, allowing the user to better identify their own location based on the alert type they hear.

In response to the sixth device's 460 audio alarm, user 300 awakens and exits the bedroom 520 and moves toward the sound identifying itself as Beacon 1. In some embodiments, the beacons that are disposed nearer to one another can be configured to emit their audio in staggered intervals, so that a user is not confused by overlapping sounds. For example, once the sixth device 460 emits the first audio output 560, there may be a pause during which another close by beacon emits its own audio output. Once the nearby audio is emitted, the sixth device 460 again emits its own audio output. The presence of some smoke and lack of familiarity with the house (for example, if guests are visiting) may make it difficult for a user to determine where to go without some assistance.

In FIG. 6, user 300 is shown moving down stairwell 610, away from 450 on the landing (emitting a repeating second audio output 650 "This is Beacon 1. You are currently on the stairwell landing. Continue downstairs toward Beacon 4") toward third device 454. The third device 454 is regularly emitting a third audio output 654 (<* ALARM TYPE 2*> "This is Beacon 3 in Foyer. Proceed toward rear exit via Beacon 2"<* ALARM TYPE 2*>) that guides the user 300 toward the bottom of the stairwell 610. Closer to an exit 640, second device 452 is also emitting its own fourth audio output 652 (<* ALARM TYPE 3*> "This is Beacon 2 in Dining Room. Exit here via Sliding Doors"<* ALARM TYPE 3*>) at regular intervals. During this time, fire 620 can be observed in an adjacent room, producing an increasing amount of smoke 630, and decreasing visibility for the user 300.

Figure 7:
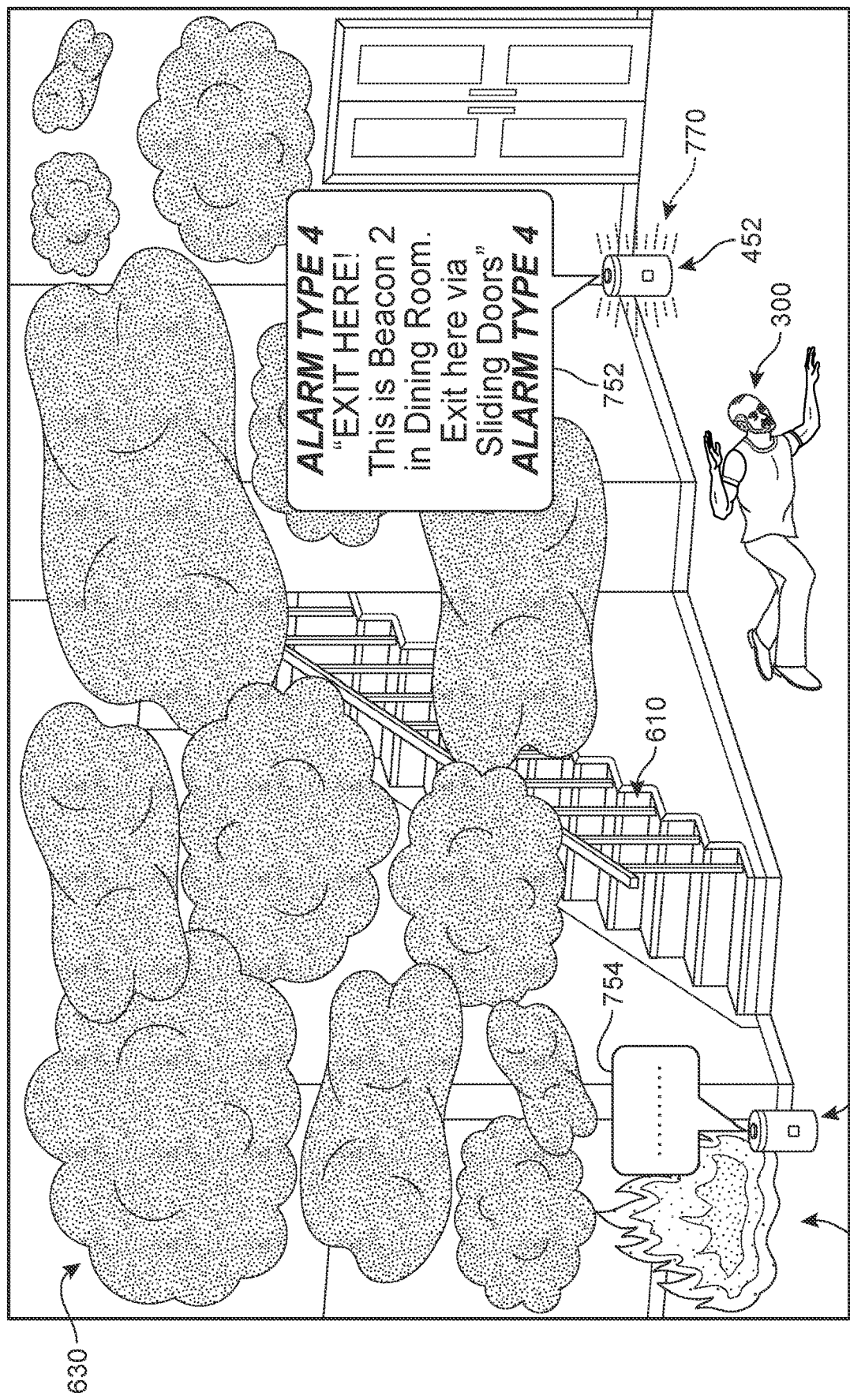

In FIG. 7, user 300 has arrived at the bottom of the stairwell 610, and finds the entire first floor is now engulfed in smoke 630, making it impossible to see or orient himself. The user 300 is now forced to crawl along the floor in order to remain safe and moves toward the sound being produced by second device 452. In some embodiments, the device nearest to an exit can be configured to blare louder and more often, as shown here, where second device 452 is shown to emit a different, fifth audio output 752 (<* ALARM TYPE 4*> "EXIT HERE! This is Beacon 2 in Dining Room. Exit here via Sliding Doors"<* ALARM TYPE 4*>) that may be played back in a sequence following the fourth audio output. Thus, the audio that is played can be a single repeating message, or several messages that are played in an order designated by the user, or pre-selected by the system for devices that are most proximate to the exit. In addition, as noted earlier, nearby devices can be configured with quiet intervals during which other devices may be heard more clearly from a distance, as represented by silent interval 754 associated with third device 454. In some embodiments, the volume of the devices can be louder if they are nearer to the exit, and softer further from the exit. Such audio directions can be useful for low visibility situations.

Furthermore, in some embodiments, one or more beacon devices can emit a light pattern or light display that can shine brightly and help guide the user to the desired endpoint. For example, in FIG. 7, the device nearest to the exit (second device 452) is producing a lighting sequence 770 that more clearly signals to the user 300 the direction in which they should move. In other embodiments, some or all of the devices can emit light. The light on each device can differ from neighboring devices to minimize confusion, and a different light color can be assigned to each room or space to allow the user to associate specific locations with a particular color and better orient themselves. In addition, different patterns of light may be used to help guide the user in the right direction. For example, the lights may flash more frequently on devices that are nearer the exit, and more slowly on those devices further from the exit. In another example, the lights may be brighter on devices that are nearer to the exit, and dimmer on those devices further from the exit. Thus, in FIG. 7, second device 452 might have the brightest light display of all of the devices in the home, and/or a light display with the most intense or highest frequency of flashing. Color signals can be useful for small children or those who are hard of hearing.

In some embodiments in which the devices include a microphone or switch, the user may be able to request that only a specific device speak and/or emit light. As an example, user 300 may reach the stairwell landing in FIG. 6 near first device 450 and say "Beacon 1, OFF" or some other command or manual interaction to mute the device and allow the user 300 to better hear the next beacon. This can also allow the system to track the progress of the user through the house. Such a system is preferred in situations in which users do not have their own mobile devices, have been separated from such devices, and/or have removed their wearable smart devices.

Thus, with the aid of information collected by local stationary IoT devices arranged in the home. For example, during a fire, the system could receive information from a smart smoke sensor. The system can determine which smoke sensor is nearest to the source of fire and use that information to infer that the room where that smoke detector is located must be avoided. If that room includes the primary exit, the system can move to the next listed exit. For example, if in the scenario of FIGS. 6 and 7 the fire was instead located in the dining room (where exit 640 is located), the system can instead direct the user 300 toward the front door to better avoid the fire. Similarly, if the fire was determined to have spread across the entire ground floor, the user 300 could be directed to exit from a window, or to await emergency services. By using multiple types of information from different kinds of sources, the user device may better infer the probability that a given location is safe or dangerous and redirect the user based on its pre-programmed routes and exits.

Figure 8:
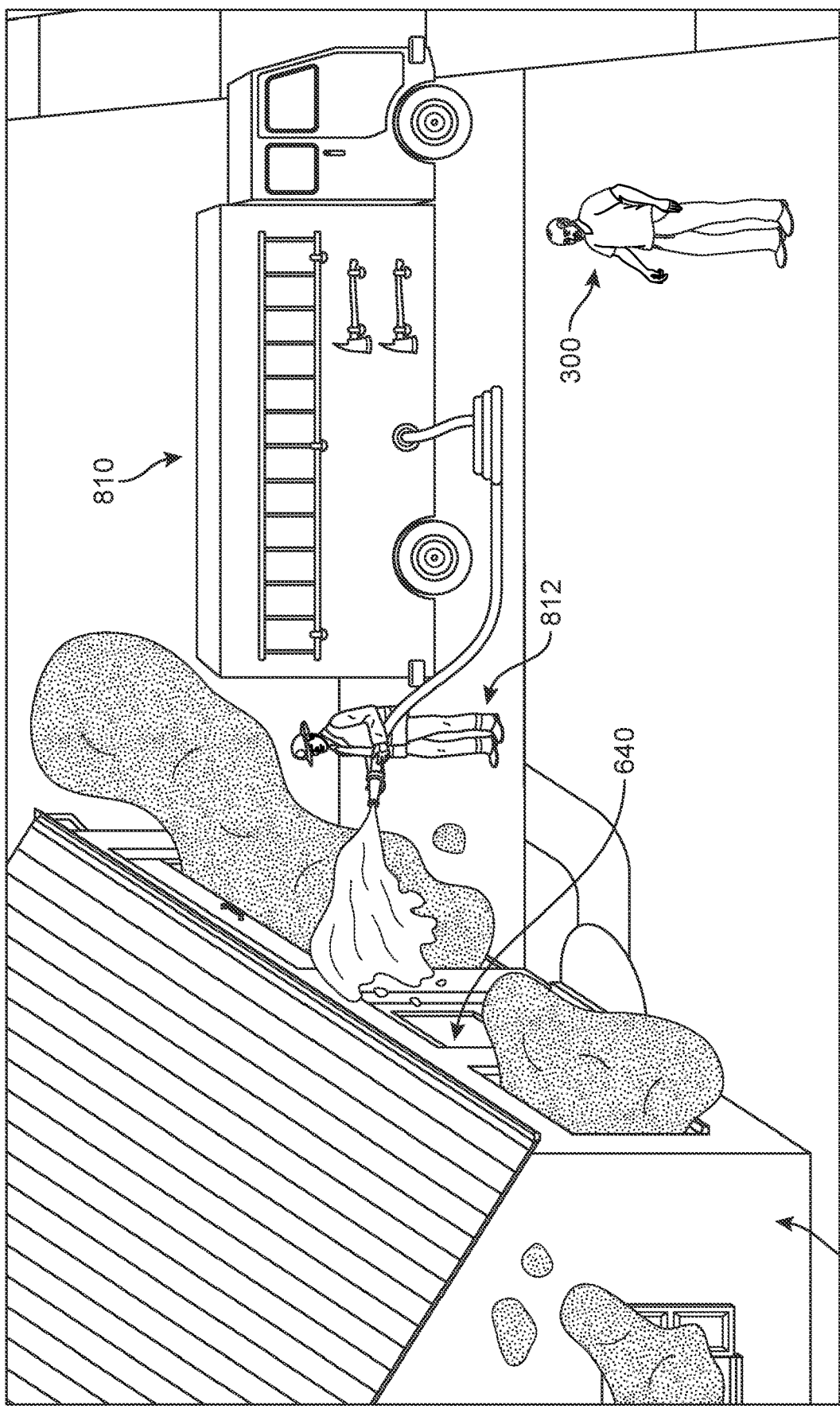
Figure 9:
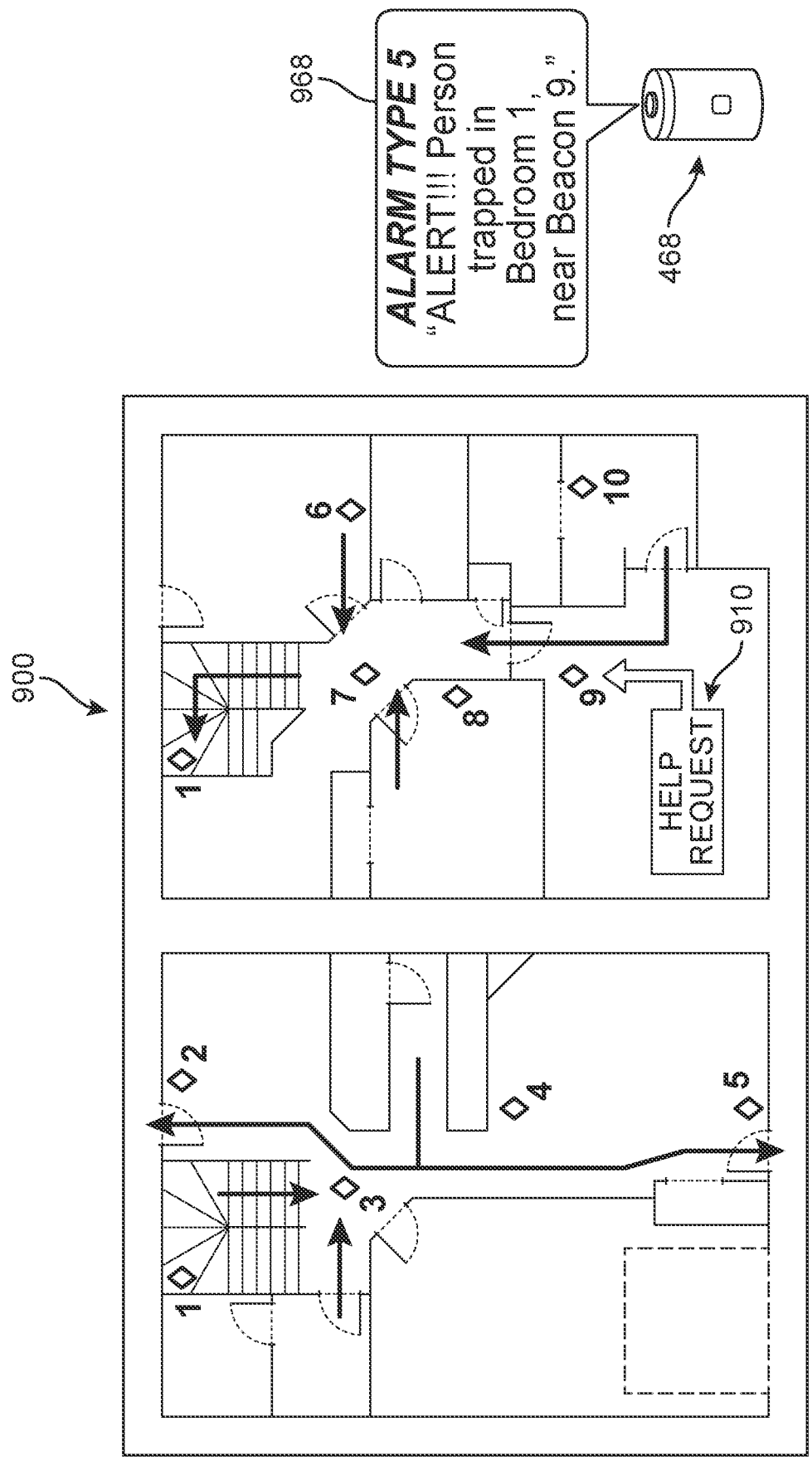
FIG. 9 is a schematic illustration of a house layout in which a help request has been received by one of the beacon devices, according to an embodiment.

In FIG. 8, user 300 has emerged from house 800 by exit 640. In some embodiments, when an alarm is activated (e.g., when one or more of the smart sensors detects a cause for concern and activates an alarm), the central server or cloud-computing platform or some other device can transmit a request to emergency responders. In one embodiment, in the event of an emergency condition, a map of the environment is sent to emergency responders. For example, upon detecting the fire, the system can call fire department 810, allowing firefighters 812 to respond more quickly to aid the occupant and respond to the growing danger to the structure in a timely fashion. Furthermore, in some embodiments in which the beacons are able to receive real-time inputs from nearby users (e.g., via voice or other commands), a user may be able to tell the beacon that they are trapped in a particular room and transmit a more specific call for help. In FIG. 9, an example of an automatically generated map is shown that may be transmitted to emergency responders and/or family or friends designated as emergency contacts by the user. Thus, if the user tells the system that he is trapped in the master bedroom closest to ninth device 468, a help request 910 may be automatically generated by the system. In some cases, the request can include an overview or map 900 of the home that pinpoints the location in which the request was received. In one embodiment, once a beacon is triggered in such a manner, one or more other beacons in the house can begin to emit a new message (such as, for example, a sixth audio output 968<* ALARM Type 5*> "ALERT!!! Person trapped in Bedroom 1, near Beacon 9"), so that other occupants can become immediately aware of the person's request.

Figure 10:
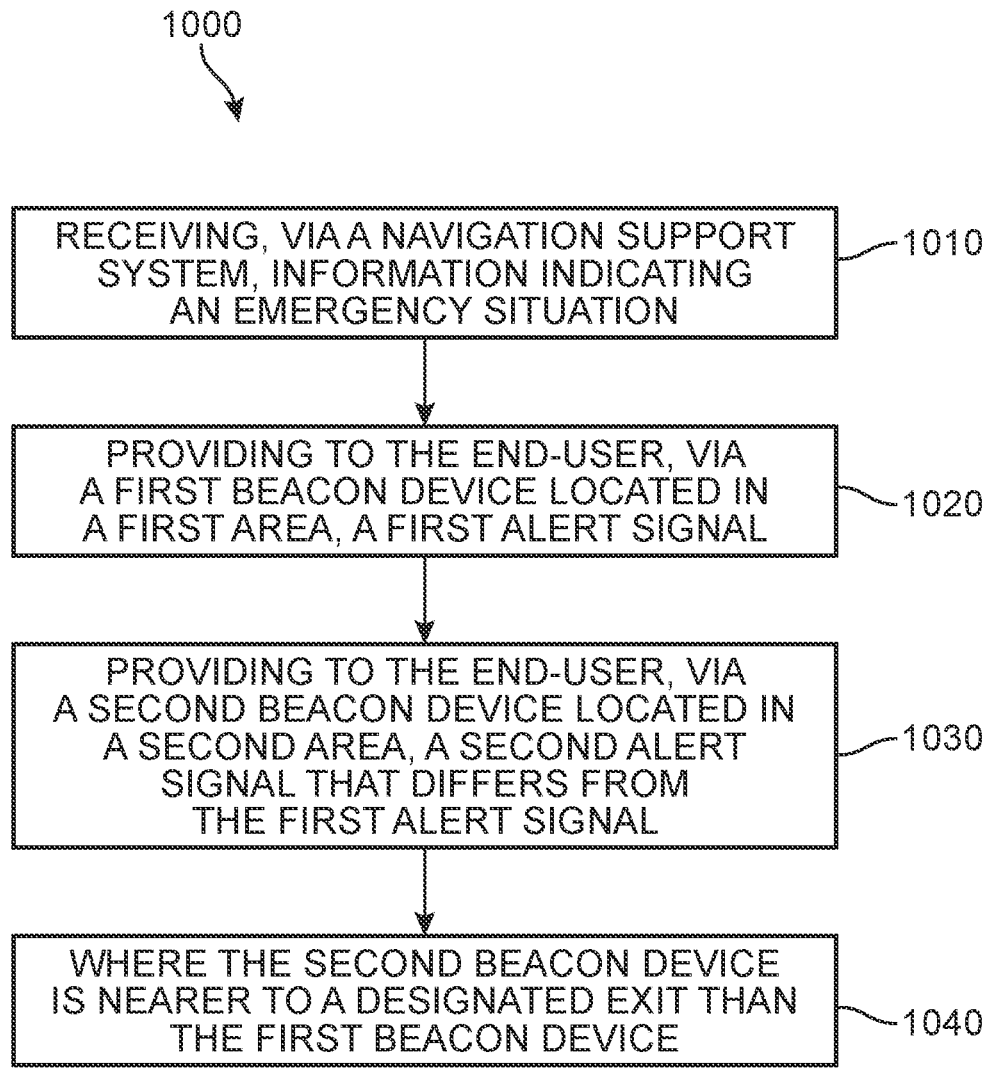
FIG. 10 is a flow diagram of a process for conveying navigation guidance to an end-user during an emergency situation, according to an embodiment.

FIG. 10 is a flow chart illustrating an embodiment of a method 1000 for conveying navigation guidance to an end-user during an emergency situation. The method 1000 includes a first step 1010 receiving, via a navigation support system, information indicating an occurrence of an emergency situation associated with a physical structure. This may lead to the system causing a beacon device network that includes a plurality of beacon devices installed in the physical structure to become activated. The method also includes a second step 1020 of providing, via a first beacon device located in a first area of the physical structure, a first alert signal. In addition, the method 1000 includes a third step 1030 of providing, via a second beacon device located in a second area of the physical area, a second alert signal that differs from the first alert signal, where the second beacon device is nearer to a designated exit of the physical structure than the first beacon device.

In other embodiments, the method may include additional steps or aspects. In one embodiment, the method also includes emitting, as the first alert signal, an audio-based message informing the end-user about the emergency situation and directing the end-user toward the second beacon device. In some cases, each of the first alert signal and the second alert signal comprise an audio-based message, and the second alert signal is louder than the first alert signal. In another example, the first alert signal is an audio-based message that identifies a room or space in which the first beacon device is located. In one embodiment, each of the first alert signal and the second alert signal comprise an audio-based message, and the second beacon device is silent when the first alert signal is being broadcast.

In some embodiments, the method also includes steps of detecting, via a smart sensor located within the physical structure, a change indicating a high probability of an emergency situation, and transmitting data from the smart sensor to the navigation support system regarding the change indicating the high probability of the emergency situation. In another embodiment, the method also includes emitting, as the first alert signal, a light display-based message informing the end-user about the emergency situation. In some cases, the first alert signal comprises a first light display pattern, and the second alert signal comprises a second light display pattern, and the first light display pattern differs from the second light display pattern. In one example, the first alert signal includes both an audio and light display-based message. In another example, the method also includes steps of receiving, at the first beacon device, a first request from the end-user to terminate the first alert signal, and terminating the first alert signal in response to the first request.

Other aspects of this method and other methods can also be contemplated within the scope of this disclosure. For example, the alert signals emitted by the beacon devices can be customized by a user, to produce a particular light pattern display and/or a specific audio message including selected tones and other content. For example, each device beacon can announce or broadcast the name of the beacon device, the name of particular room in which it has been placed, and/or a description of the physical objects in the room to help a user navigate through the room (e.g., "There is a sofa here, as well as a coffee table"). Colors of the light being emitted can vary for each beacon device, helping to orient the user in the desired direction, and/or the frequency of the light flashes can change (e.g., become slower or faster) in beacon devices as one approaches the designated exit. Furthermore, an end-user may use an application to preprogram the beacon devices to the network and specific locations in an automatically generated or manually created map of the structure. Similarly, the exit route(s) can be mapped or entered by the end-user, or the application can recommend the suggested route(s) from each possible 'starting' location. In some embodiments, the activation of the beacon devices guiding the end-user can also automatically trigger a call or other communication to emergency services. In another embodiment, the beacon devices may be configured to receive voice commands from an end-user during the navigation process to request a re-routing in the case that the end-user encounters difficulty while attempting to move along through the first suggested route. While the navigation support system can be enabled automatically based on smart sensor data or other information collected by the system, it should be understood that navigation cues can be activated manually by the end-user.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for conveying navigation guidance to an end-user during an emergency situation, the method comprising:
receiving, via a navigation support system, information indicating an occurrence of an emergency situation associated with a physical structure;
activating a beacon device network that includes a plurality of beacon devices including at least a first beacon device, a second beacon device, a third beacon device, and a fourth beacon device;
wherein the plurality of beacon devices are installed in the physical structure by being at least one of mounted on, integrated with, and/or supported by a wall, floor, ceiling, or other surface;
providing, via the first beacon device located in a first area of the physical structure, a first alert signal;
providing, via the second beacon device located in a second area of the physical structure, a second alert signal that differs from the first alert signal;
wherein the second beacon device is nearer to a designated exit of the physical structure than the first beacon device;
wherein the first beacon device and the second beacon device define, at least in part, a first evacuation route mapped out by the navigation support system;
wherein the third beacon device and the fourth beacon device define, at least in part, a second evacuation route mapped out by the navigation support system;
wherein the first evacuation route begins at a first area within the physical structure and the second evacuation route begins at a second area within the physical structure that is different than the first area;
managing the beacon devices of the first evacuation route independently from the beacon devices of the second evacuation route;
receiving voice commands by at least one of the beacon devices from an occupant of the physical structure indicating that the occupant is trapped within the physical structure; and
providing an alert signal with one or more beacon devices indicating to a first responder that the occupant is trapped and where they are located.

2. The method of claim 1, further comprising emitting, as the first alert signal, an audio-based message informing the end-user about the emergency situation and directing the end-user toward the second beacon device.

3. The method of claim 1, wherein each of the first alert signal and the second alert signal comprise an audio-based message, and the second alert signal is louder than the first alert signal.

4. The method of claim 1, wherein the first alert signal is an audio-based message that identifies a room or space in which the first beacon device is located.

5. The method of claim 1, wherein each of the first alert signal and the second alert signal comprise an audio-based message, and the second beacon device is silent when the first alert signal is being broadcast.

6. The method of claim 1, further comprising:
detecting, via a smart sensor located within the physical structure, a change indicating a high probability of an emergency situation; and
transmitting data from the smart sensor to the navigation support system regarding the change indicating the high probability of the emergency situation.

7. The method of claim 1, further comprising emitting, as the first alert signal, a light display-based message informing the end-user about the emergency situation.

8. The method of claim 1, wherein the first alert signal comprises a first light display pattern, and the second alert signal comprises a second light display pattern, and the first light display pattern differs from the second light display pattern.

9. The method of claim 1, wherein the first alert signal includes an audio alert.

10. The method of claim 9, wherein the first alert signal includes both an audio alert and a light display-based message.

11. A system for providing navigation guidance to an end-user during an emergency situation, the system comprising a processor and machine-readable media including instructions which, when executed by the processor, cause the processor to:
receive, via a navigation support system, information indicating an occurrence of an emergency situation associated with a physical structure;
provide navigational guidance using a plurality of beacon devices including a first beacon device, a second beacon device, a third beacon device, and a fourth beacon device;
wherein the plurality of beacon devices are installed in the physical structure by being at least one of mounted on, integrated with, and/or supported by a wall, floor, ceiling, or other surface;
wherein the navigational guidance includes providing, via the first beacon device located in a first area of the physical structure, a first alert signal;
provide, via the second beacon device located in a second area of the physical area, a second alert signal that differs from the first alert signal;
wherein the second beacon device is nearer to a designated exit of the physical structure than the first beacon device;
wherein the first beacon device and the second beacon device define, at least in part, a first evacuation route mapped out by the system;
wherein the third beacon device and the fourth beacon device define, at least in part, a second evacuation route mapped out by the system;
wherein the first evacuation route begins at a first area within the physical structure and the second evacuation route begins at a second area within the physical structure that is different than the first area;
wherein the machine-readable media further includes instructions to:
manage the beacon devices of the first evacuation route independently from the beacon devices of the second evacuation route;
receive voice commands by at least one of the beacon devices from an occupant of the physical structure indicating that the occupant is trapped within the physical structure; and
provide an alert signal with one or more beacon devices indicating to a first responder that the occupant is trapped and where they are located.

12. The system of claim 11, wherein the instructions further cause the processor to emit, as the first alert signal, an audio-based message informing the end-user about the emergency situation and directing the end-user toward the second beacon device.

13. The system of claim 11, wherein each of the first alert signal and the second alert signal comprise an audio-based message, and the second alert signal is louder than the first alert signal.

14. The system of claim 11, wherein the first alert signal is an audio-based message that identifies a room or space in which the first beacon device is located.

15. The system of claim 11, wherein each of the first alert signal and the second alert signal comprise an audio-based message, and the second beacon device is silent when the first alert signal is being broadcast.

16. The system of claim 11, wherein the instructions further cause the processor to:
   detect, via a smart sensor located within the physical structure, a change indicating a high probability of an emergency situation; and
   transmit data from the smart sensor to the navigation support system regarding the change indicating the high probability of the emergency situation.

17. The system of claim 11, wherein the instructions further cause the processor to emit, as the first alert signal, a light display-based message informing the end-user about the emergency situation.

18. The system of claim 11, wherein the first alert signal comprises a first light display pattern, and the second alert signal comprises a second light display pattern, and the first light display pattern differs from the second light display pattern.

19. The system of claim 11, wherein the first alert signal includes both an audio and light display-based message.

20. A beacon device network configured to provide navigation guidance to an end-user in an emergency, the beacon device network including:
   a navigation server;
   a plurality of beacon devices configured to emit one or both of an audio-based signal and a light display, the plurality of beacon devices including at least a first beacon device, a second beacon device, a third beacon device, and a fourth beacon device;
   wherein the plurality of beacon devices are installed in the physical structure by being at least one of mounted on, integrated with, and/or supported by a wall, floor, ceiling, or other surface;
   wherein:
      each of the plurality of beacon devices is positioned in different areas of a physical structure;
      each of the plurality of beacon devices includes a communication module for communicating with the navigation server over a network; and
      each of the plurality of beacon devices emits an alert signal in response to a request from the navigation server;
   wherein the network is configured to:
   receive voice commands by at least one of the beacon devices from an occupant of the physical structure indicating that the occupant is trapped within the physical structure; and
   provide an alert signal with one or more of the plurality of beacon devices indicating to a first responder that the occupant is trapped and where they are located.

* * * * *